(12) United States Patent
Newman et al.

(10) Patent No.: US 8,189,305 B2
(45) Date of Patent: May 29, 2012

(54) AUXILIARY BATTERY SYSTEM

(76) Inventors: Robert Charles Newman, Emmaus, PA (US); Jason O Adams, Emmaus, PA (US)

( * ) Notice: Subject to any disclaimer, the term of this patent is extended or adjusted under 35 U.S.C. 154(b) by 205 days.

(21) Appl. No.: 12/804,276

(22) Filed: Jul. 19, 2010

(65) Prior Publication Data

US 2012/0013175 A1    Jan. 19, 2012

(51) Int. Cl.
*H02H 5/04* (2006.01)
(52) U.S. Cl. ............................................. 361/18; 361/23
(58) Field of Classification Search .................... 361/18, 361/23, 91.1; 307/9.1, 66; 320/101, 104
See application file for complete search history.

(56) References Cited

U.S. PATENT DOCUMENTS

| | | |
|---|---|---|
| 7,622,818 B2 | 2/2008 | Ausman et al. |
| 2001/0026142 A1* | 10/2001 | Furukawa et al. ............. 320/103 |
| 2004/0164705 A1* | 8/2004 | Taniguchi ..................... 320/104 |
| 2004/0201931 A1 | 10/2004 | Korcharz et al. |

OTHER PUBLICATIONS

Dept. of Transportation, Federal Aviation Administration, Aircraft Certification Service; Technical Standard Order, TSO-C174; Jul. 25, 2005; pp. 1-15, Washington, DC.
Power-Safe Back-up Battery with Monitor Output, GRT Avionics, Inc., Battery Backup RevB.cdr; [online], [retrieved on Oct. 14, 2010]; Retrieved from GRT Avionics, Inc. website using Internet <URL: http://www.grtavionics.com/File/Wiring%20Diagrams/Battery%20Backup%20Rev%20B.pdf.

* cited by examiner

*Primary Examiner* — Danny Nguyen

(57) ABSTRACT

An auxiliary power system for an electrical load in a vehicle electrical system includes an auxiliary battery, a thermal transducer in physical contact with the auxiliary battery, a charger circuit for controlling the charging of the battery in response to at least a temperature of the auxiliary battery, and an output power delivery circuit for providing power to an electrical load during normal and emergency conditions. The auxiliary power system is housed in a thermally-conductive enclosure that is in thermal communication with the charger circuit and the power delivered circuit. The power delivery circuit selectively delivers power to the electrical output from both an electrical input terminal and from the battery based on the magnitude of a voltage available on the electrical input terminal.

21 Claims, 10 Drawing Sheets

AUXILIARY BATTERY SYSTEM

BACKGROUND OF THE INVENTION

1. Field of the Invention

The present invention relates to electrical systems for vehicles, and more particularly, to an auxiliary battery system for providing back-up power to an electrical system of an aircraft.

2. Description of the Related Art

Vehicle electrical systems generally comprise a collection of electrical loads connected to a primary electrical bus, a rechargeable battery and source of power such as an engine driven alternator. FIG. 1A is a simplified block diagram of a prior art vehicle electrical system 10 having a primary electrical bus 12, a rechargeable battery 14, and an engine-drive alternator 15. The primary electrical bus 12 provides power to electrical loads 16 via a wire connection and interconnects the engine driven alternator 15 and rechargeable battery 14. The electrical loads 16 may comprise, for example, one or more lighting loads, a radio, a global positioning system (GPS) receiver, or an electronic flight information system (EFIS). The vehicle electrical system 10 may include a master contactor 18 that allows the primary electrical bus 12 to be disconnected from the rechargeable battery 14. When the vehicle electrical system 10 is de-energized, such that the engine driven alternator 15 is not producing power, the electrical loads 16 receive no power.

The prior art vehicle electrical system 10 shown in FIG. 1A has no true back-up source of power. The alternator 15 serves as the primary source of continuous power for the vehicle electrical system 10, while the rechargeable battery 14 ensures stability of the alternator 15 and serves as a temporary alternate source of power. During a failure of the alternator 15, the prior art vehicle electrical system 10 is limited to the endurance of the primary rechargeable battery 14. In the case of a failure of the master contactor 18, the prior art vehicle electrical system 10 may completely shut down because the alternator 15 may not be inherently stable without the primary rechargeable battery 14. Accordingly, the prior art vehicle electrical system 10 shown in FIG. 1A has limited use in aircraft electrical systems as it is prone to a single point of failure resulting in loss of electrical power.

FIG. 1B is a simplified block diagram of an enhanced prior art vehicle electrical system 20 including a second rechargeable battery 22 and a second contactor 24. The vehicle electrical system 20 of FIG. 1B provides the benefit of the redundancy of the second rechargeable battery 22 and the second contactor 24. However, as found in many aircraft, the second rechargeable battery 22 comprises a lead-acid (Pb-acid) type and is quite heavy and bulky, which are both highly undesirable qualities in airborne equipment.

The vehicle electrical system 20 of FIG. 1B is able to provide back-up power to all of the connected electrical loads 16 connected to the primary electrical bus 12. Unfortunately, during a failure of the alternator 15, all the electrical loads 16 will drain both of the rechargeable batteries 14, 22. Since many of the electrical loads 16 on the primary electrical bus 12 are often non-essential loads that can be safely shut-off during a failure of the alternator 15, it undesirable to have all of the electrical loads draining both of the rechargeable batteries 14, 22. In the vehicle electrical system 20 shown in FIG. 1B, it is up to the operator of the system to remember to shed (i.e., turn off) these loads to maximize operating duration of the batteries 14, 22.

FIG. 1C is a simplified block diagram of yet another prior art vehicle electrical system 30 that provides additional back-up power solutions. The vehicle electrical system 30 of FIG. 1C comprises an electrical load 32 that has an internal back-up battery 34, which provides complete independence from the primary electrical system (i.e., the alternator 15 and the batteries 14, 22). The vehicle electrical system 30 systematically ensures that each piece of equipment that requires back-up power has its own source of power. However, the vehicle electrical system 30 may require the maintenance of many back-up batteries 34, and additionally requires that the back-up batteries be located in very harsh environments, i.e., inside flight instruments, such as the EFIS system.

There is a need for a self-contained, light weight back-up battery system that provides power to critical electrical loads and operates automatically with respect to the condition of the primary electrical bus.

SUMMARY OF THE INVENTION

According to an embodiment of the present invention, an auxiliary power system for an electrical load in a vehicle electrical system having a primary electrical bus and an electrical load comprises an auxiliary battery, a thermal transducer in physical contact with the auxiliary battery, a charger circuit for controlling the charging of the battery in response to at least a temperature of the auxiliary battery, and an output power delivery circuit for providing power to the electrical load during normal and emergency conditions. The auxiliary power system also comprises an electrical input adapted to be connected to the primary electrical bus for receiving power from the primary electrical bus, and an electrical output adapted to be coupled in electrical communication with the electrical load of the vehicle electrical system. The auxiliary battery has first and second terminals for producing a battery voltage that provides auxiliary power to the electrical load through the electrical output. The thermal transducer generates an electrical signal representative of the temperature of the auxiliary battery.

The charger circuit is electrically connected to the first and second terminals of the auxiliary battery and is responsive to the thermal transducer. The charger circuit is adapted to receive power from the primary electrical bus through the electrical input, and to deliver a controlled charging current to the auxiliary battery via the first and second terminals. The charger circuit is operable to control the amount of charging current delivered to the auxiliary battery in response to the temperature of the auxiliary battery.

The output power delivery circuit comprises first and second unidirectional electrically conductive devices and a controllably conductive device. The first unidirectional electrically conductive device is electrically coupled between the electrical input and the electrical output so as to provide power to the electrical load from the electrical input during a normal power condition. The second unidirectional electrically conductive device is electrically coupled in series with the controllably conductive device. The series combination of the second unidirectional electrically conductive device and the controllably conductive device is electrically coupled between the electrical output and at least one of the first and second terminals of the auxiliary battery, so as to provide a path for power delivery from the auxiliary battery to the electrical load during an emergency power condition.

According to another embodiment of the present invention, an apparatus for providing emergency and normal power to an electrical load in vehicle electrical system comprises: (1) first and second electrical inputs to the apparatus, the first and the second electrical inputs adapted to be electrically connected to a source of DC power available in the vehicle electrical system; (2) an electrical output of the apparatus connectable to the electrical load; (3) a rechargeable battery having first and second main terminals, the rechargeable battery operable to receive and deliver electrical power; (4) a battery charging circuit operable to receive electrical power from the first electrical input and in direct electrical communication with the first and second main terminals of the rechargeable battery; (5) a power delivery circuit electrically coupled between the second electrical input and the electrical output, the power delivery circuit further electrically coupled to the rechargeable battery for additionally receiving power from the rechargeable battery, the power delivery circuit directing the flow of power available to the electrical output of the apparatus from either the second electrical input or the rechargeable battery; and (6) a thermally-conductive enclosure housing the rechargeable battery, the battery charging circuit, the first and second electrical inputs, the electrical output and the power delivery circuit; wherein the power delivery circuit and the battery charging circuit are in thermal communication with the thermally-conductive enclosure.

According to another embodiment of the present invention, a back-up battery power delivery system comprises: (1) an enclosure; (2) a rechargeable battery within the enclosure; (3) a battery management circuit within the enclosure, wherein the battery management circuit is operable to maintain the charge state of the rechargeable battery; (4) a power delivery circuit within the enclosure; (5) an electrical input adapted to receive power to charge the rechargeable battery and to deliver electrical power to the power delivery circuit; and (6) an electrical output adapted to provide electrical power to a load connected to the back-up battery power delivery system; wherein the power delivery circuit is adapted to receive power from both the electrical input and from the rechargeable battery and selectively delivers power to the electrical output based on the magnitude of the voltage available on the electrical input.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1A:
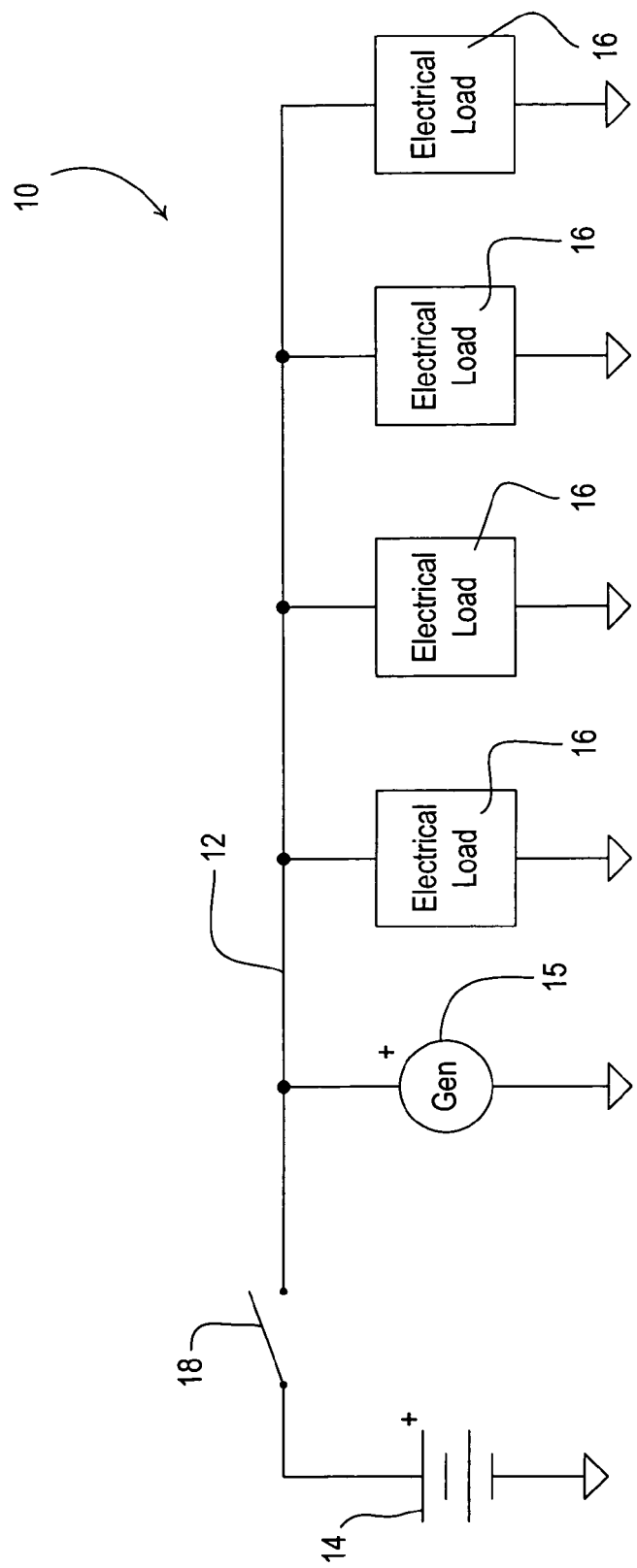
FIG. 1A is a simplified block diagram of a prior art vehicle electrical system having electrical loads, a primary electrical bus, a rechargeable battery, and a source of power.
Figure 1B:
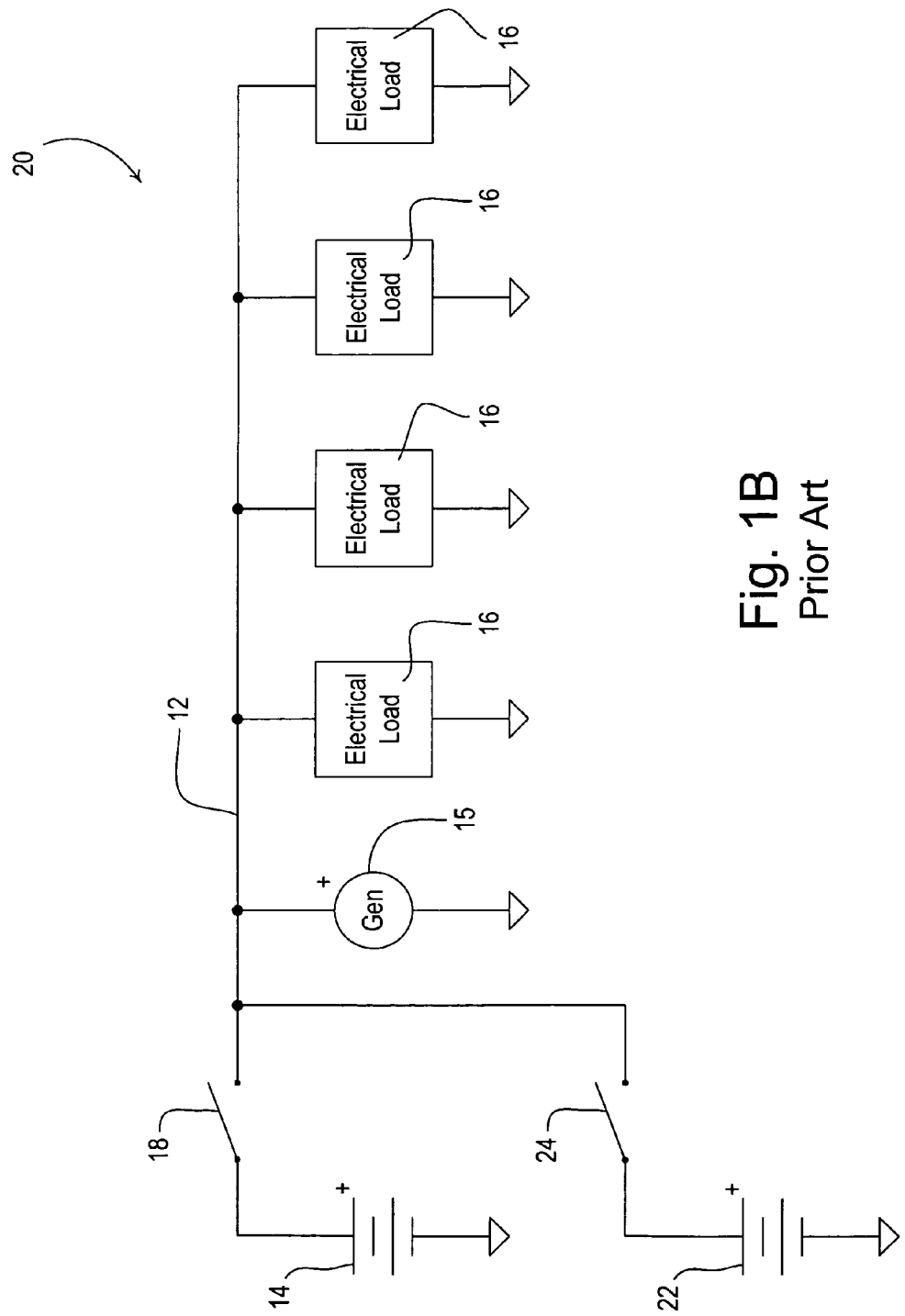
FIG. 1B is a simplified block diagram of an enhanced prior art vehicle electrical system including a second rechargeable battery and a second contactor.
Figure 1C:
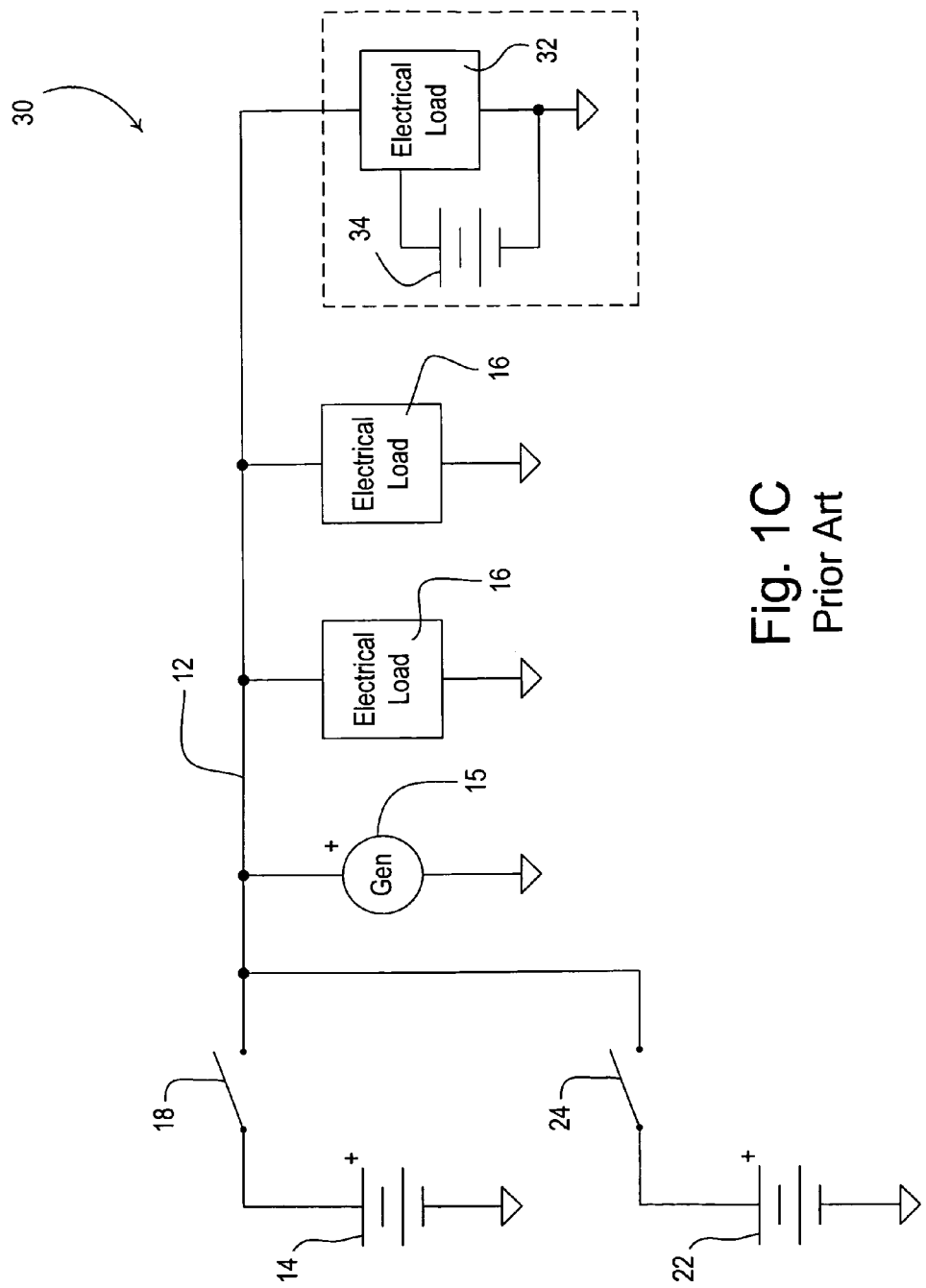
FIG. 1C is a simplified block diagram of a third prior art vehicle electrical system having an electrical load having an internal back-up battery.

The foregoing summary, as well as the following detailed description of an embodiment of the present invention, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
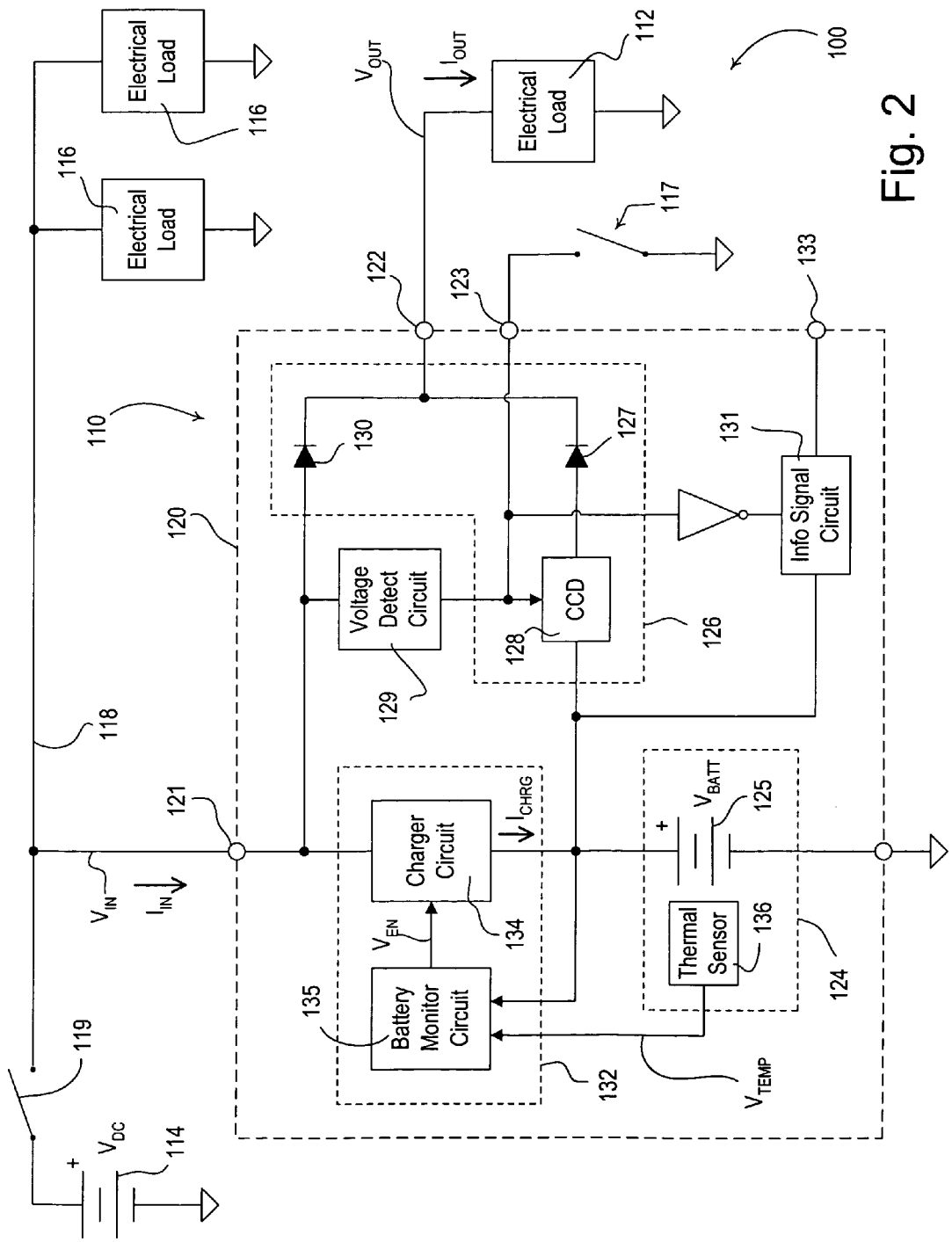
FIG. 2 is a simplified block diagram of a vehicle electrical system having an auxiliary power system for providing normal and emergency power to an electrical load according to a first embodiment of the present invention.

FIG. 2 is a simplified block diagram of a vehicle electrical system 100 having an auxiliary power system 110 for providing normal and emergency power to an electrical load 112 according to a first embodiment of the present invention. A direct-current (DC) power source 114, such as a lead-acid (Pb-acid) rechargeable battery, provides a DC supply voltage $V_{DC}$ for supplying power to various electrical loads 116 in the vehicle electrical system 100 via a wire connection referred to as a primary electrical bus 118. The vehicle electrical system 100 comprises a master contactor 119 that allows the primary electrical bus 118 to be disconnected from the DC power source 114.

The auxiliary power system 110 is housed in a thermally-conductive enclosure 120, which is made of, for example, cast aluminum. The enclosure 120 receives power from the DC power source 114 via an electrical input terminal 121, and provides auxiliary power to the electrical load 112 via an electrical output terminal 122. Specifically, the electrical input terminal 121 receives an input voltage $V_{IN}$ present on the primary electrical bus 118, and conducts an input current $I_{IN}$ from the DC power source 114. For example, the magnitude of the input voltage $V_{IN}$ may be in the range of approximately 10-15 volts, and the magnitude of input current may have a magnitude of up to approximately 9.75 amps continuous. In addition, the electrical output terminal 122 provides an output voltage $V_{OUT}$ to the electrical load 112 (e.g., approximately 10-12 volts) and conducts an output current $I_{OUT}$ to the load. For example, the output current Iout may have a magnitude of up to approximately 6 amps continuous or up to approximately 9 amps for radio transmissions and transient loads.

The electrical load 112 that receives auxiliary power via the electrical output terminal 122 may be a critical piece of equipment on an aircraft such as an electronic flight instrument system (EFIS), a global positioning system (GPS) receiver, or an electronic ignition module for the aircraft engine. Notably, the electrical load 112 may comprise a group of critical instruments that require a stable and reliable source of electrical power. Alternatively, the auxiliary power system 100 may comprise multiple electrical output terminals 122 for separately providing back-up power to respective electrical loads 112.

The auxiliary power system 110 also includes a battery pack 124, which is contained within the enclosure 120 and is in direct thermal communication with the enclosure. The battery pack 124 comprises a rechargeable auxiliary battery 125, which produces a battery voltage $V_{BATT}$ and has a capacity of C, which is expressed in amp-hours. The battery 125 may also have a charge rate equal to the capacity number C. For example, a battery 125 with a capacity of three amp-hours may have a corresponding charge rate of three amps. The rechargeable battery 125 is preferably of a nickel-metal hydride (Ni-mh) chemistry or a lithium-ion chemistry. These types of batteries have an energy density with respect to weight and volume that is a two to three times improvement over lead-acid chemistry batteries. The rechargeable battery 125 has first and second terminals that are coupled to provide auxiliary power to the electrical load 112.

The auxiliary power system 110 further comprises an output power delivery circuit 126 having a unidirectional electrically conductive device 127 (e.g., a standard diode or a Schottky-type diode) and a controllably conductive device 128. For example, the controllably conductive device 128 may be implemented as a metal-oxide semiconductor field-effect transistor (MOSFET), a bipolar junction transistor (BJT), a relay, or any suitable switching device having a control terminal and at least two power conducting terminals. The rechargeable battery 125 is connected to the electrical load 112 through the series combination of the unidirectional electrically conductive device 127 and the controllably conductive device 128. The output power delivery circuit 126 is housed in the thermally-conductive enclosure 120 and may be in direct thermal communication with the enclosure, such that the enclosure forms a heat sink to dissipate thermal losses generated in the power delivery circuit.

The auxiliary power system 110 comprises a voltage detect circuit 129, which is operable to render the controllably conductive device 128 conductive and non-conductive in response to the magnitude of the input voltage $V_{IN}$ on the primary electrical bus 118. When the magnitude of the input voltage $V_{IN}$ on the primary electrical bus 118 is above a predetermined bus voltage threshold $V_{BUS-TH}$ (e.g., approximately ten volts), the voltage detect circuit 129 renders the controllably conductive device 128 non-conductive. During emergency conditions (e.g., a failure of the DC power source 114 or the master contactor 119), the voltage detect circuit 129 renders the controllably conductive device 128 conductive when the magnitude of the input voltage $V_{IN}$ on the primary electrical bus 118 drops below the predetermined bus voltage threshold $V_{BUS-TH}$, such that the controllably conductive device provides a path for power delivery from the rechargeable battery 125 to the electrical load 112. Specifically, when the controllably conductive device 128 is conductive and the magnitude of the battery voltage $V_{BATT}$ of the rechargeable battery 125 is greater than the magnitude of the input voltage $V_{IN}$ on the primary electrical bus 118, current flows from the rechargeable battery 125 through the series combination of the unidirectional electrically conductive device 127 and the controllably conductive device 128 to the electrical load 112.

In addition, the auxiliary power system 110 comprises an auxiliary power system enable terminal 123 that is adapted to be coupled to an external switch 117 for enabling and disabling the auxiliary power system. Specifically, when the external switch 117 is open, the controllably conductive device 128 of the output power delivery circuit 126 is rendered non-conductive so as to prevent the auxiliary power system 110 from providing auxiliary power to the electrical load 112 from the rechargeable battery 125. When the external switch 117 is closed, the auxiliary power system 110 is enabled to render the controllably conductive device 128 conductive and non-conductive in response to the magnitude of the input voltage $V_{IN}$ on the primary electrical bus 118 (i.e., via the voltage detect circuit 129).

The output power delivery circuit 126 further comprises a unidirectional electrically conductive device 130 (e.g., a standard diode or a Schottky-type diode) connected between the electrical input terminal 121 and the electrical output terminal 122 of the auxiliary power system. The unidirectional electrically conductive device 130 provides a path for current to flow directly from the primary electrical bus 118 to the electrical load 112 during normal power conditions (i.e., when the input voltage $V_{IN}$ on the primary electrical bus is greater than the predetermined bus voltage threshold $V_{BUS-TH}$).

During normal power conditions, the auxiliary power system 110 is operable to provide an information output signal on an information signal terminal 133, that may be connected to, for example, the EFIS. The information output signal may be derived from the voltage detect circuit 129 and the magnitude of the battery voltage $V_{BATT}$ of the battery 125. The auxiliary power system 110 comprises an information signal circuit 131, which is coupled between the information signal terminal 133 and the rechargeable battery 125. The information signal circuit 131 is enabled to provide the information output signal on the information signal terminal 133 when the controllably conductive device 128 is rendered non-conductive. Accordingly, during normal power conditions (i.e., when the magnitude of the input voltage $V_{IN}$ on the primary electrical bus 118 is above the predetermined bus voltage threshold $V_{BUS-TH}$), the information signal circuit 131 provides the information output signal on the information signal terminal 133, such that, for example, the EFIS may be operable to measure the magnitude of the battery voltage $V_{BATT}$. During emergency conditions, the information signal circuit 131 drives the voltage at the information signal terminal 133 to approximately zero volts to signal that the electrical load 112 is receiving electrical power from the rechargeable battery 125.

The auxiliary power system 110 additionally contains a battery management circuit 132 that manages the charge state of the rechargeable battery 125 (i.e., whether the battery is charging or not) in order to maintain the energy stored in the battery, and consequently, the magnitude of the battery voltage $V_{BATT}$ at an acceptable level. The battery management circuit 132 includes a charger circuit 134 that receives power from the DC power source 114 through the electrical input terminal 121. The charger circuit 134 is housed in the enclosure 120 and may be in direct thermal communication with the enclosure, such that the enclosure acts as a heat sink to dissipate thermal losses generated in the charger circuit. The charger circuit 134 is electrically connected to the first and second terminals of the rechargeable battery 125 to deliver a controlled (i.e., regulated) charging current $I_{CHRG}$ for providing properly conditioned power to recharge the battery. The regulated charging current $I_{CHRG}$ may have a magnitude in the range of approximately 0.25 to 2 times the capacity C of the rechargeable battery 125. When the rechargeable battery 125 is a Ni-mh type battery, the charger circuit 134 may have a constant current source characteristic for properly charging the rechargeable battery. When the rechargeable battery 125 has a lithium-ion chemistry, the charger circuit 134 may include a combination of current-limiting and precision voltage-limiting circuits to properly charge the battery.

The battery management circuit 132 also comprises a battery monitor circuit 135 that is operable to measure at least one parameter of the rechargeable battery 125 for determination of the charge state of the battery. The battery monitor circuit 135 provides a charging enable control signal $V_{EN}$ to the charger circuit 134 for enabling and disabling the charging of the battery 125. Preferably, the battery monitor circuit 135 monitors and controls the charging of the battery 125 using two or more parameters, such as, for example, the magnitude of the battery voltage $V_{BATT}$ and a temperature $T_{BATT}$ of the rechargeable battery 125. The battery monitor circuit 135 may be operable to begin the charging of the rechargeable battery 125 if the magnitude of the battery voltage $V_{BATT}$ drops below a minimum battery voltage threshold $V_{BATT-MIN}$. Alternatively, the battery monitor circuit 135 may be operable to begin the charging of the rechargeable battery 125 each time that the auxiliary power system 110 is powered up.

In addition, the battery monitor circuit 135 is operable to detect the completion of the charging of the rechargeable battery 125 and thus stop conducting the charging current $I_{CHRG}$ to stop the charging of the battery. Specifically, the battery monitor circuit 135 is operable to stop charging the battery 125 in response to a decrease in the magnitude of the battery voltage $V_{BATT}$, e.g., when the rate of change of the magnitude of the battery voltage $V_{BATT}$ exceeds a predetermined negative rate (e.g., approximately four mV/sec). Alternatively, the battery monitor circuit 135 may be operable to stop charging the battery 125 when the magnitude of the battery voltage $V_{BATT}$ exceeds a predetermined charging voltage threshold $V_{CH-TH}$ (e.g., approximately 16 volts). The auxiliary power system 110 may also comprise a DC power supply (not shown), e.g., a linear regulator, for generating a DC supply voltage $V_{CC}$ (e.g., approximately five volts) for powering the battery monitor circuit 135.

As shown in FIG. 2, the battery pack 124 comprises an integral thermal sensor 136 (i.e., a thermal transducer) that is thermally coupled to the rechargeable battery 125, e.g., in physical contact with the rechargeable battery. For example, the thermal sensor 136 may comprise a negative temperature coefficient (NTC) type thermistor, a thermal couple, or a direct temperature sensing integrated circuit (IC). The thermal sensor 136 is electrically coupled to the battery management circuit 132 for generating a temperature control signal $V_{TEMP}$ that is representative of the temperature $T_{BATT}$ of the battery 125. The battery monitor circuit 135 is operable to monitor the temperature $T_{BATT}$ of the rechargeable battery 125 in response to the temperature control signal $V_{TEMP}$. The battery management circuit 132 may additionally monitor the absolute value of the temperature $T_{BATT}$ of the rechargeable battery 125 and/or track the rate change of the temperature $T_{BATT}$ (i.e., $\Delta T_{BATT}/\Delta t$). The completion of the charging of the rechargeable battery 125 may be detected by identifying a rapid increase in the temperature $T_{BATT}$, such as, for example, an increase at a rate of more than one degree Celsius per minute, which is known as a good indication of the completion of the charging of Ni-mh type batteries.

Figure 3:
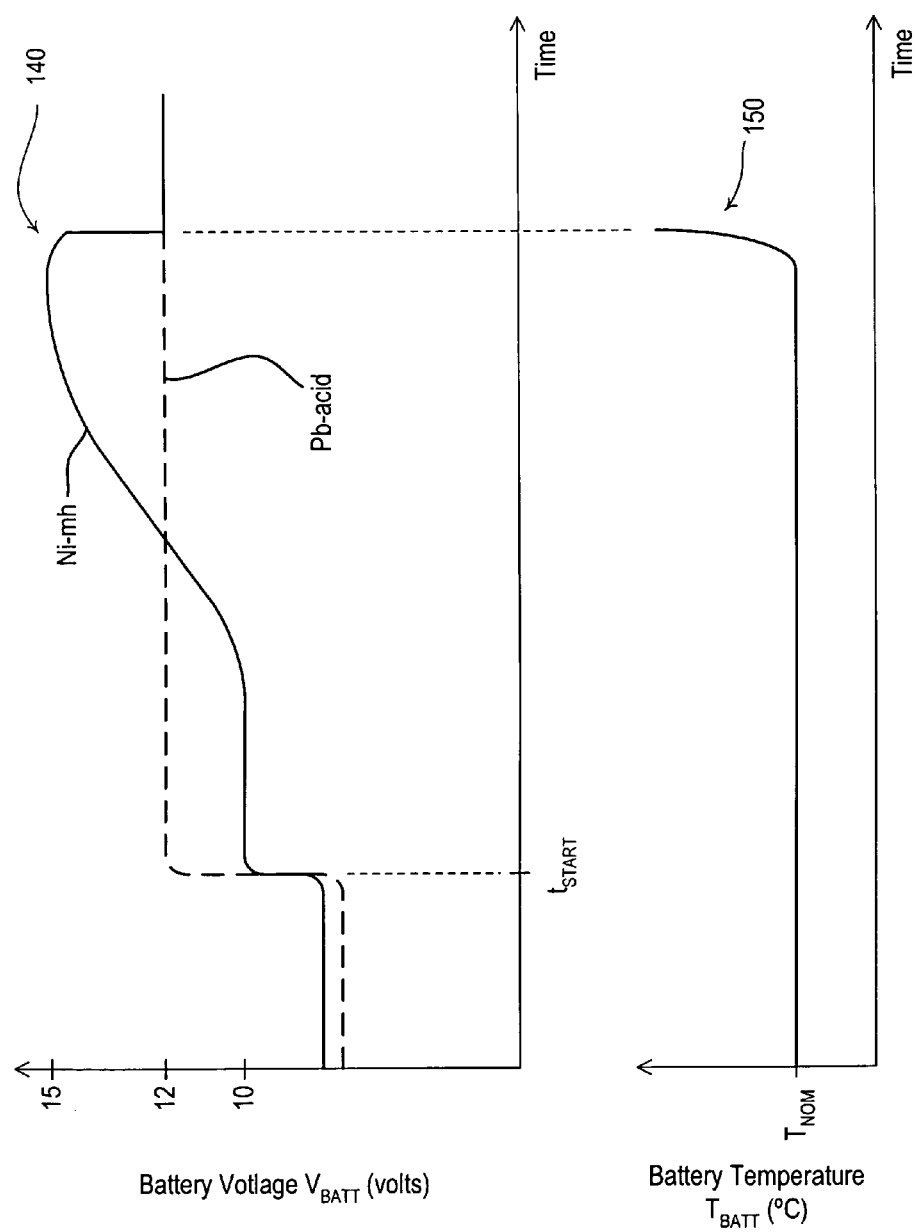
FIG. 3 shows a comparison between examples of the charging voltage that is required for a nickel-metal hydride type battery and a lead-acid type battery, as well as a timing diagram of a temperature of the batteries, during a charge cycle.

The charger circuit 134 of the battery management circuit 132 is properly matched to the battery chemistry used for the rechargeable battery 125. FIG. 3 shows a comparison between examples of the charging voltage (i.e., the battery voltage across the terminals of the battery) that is required for a Ni-mh type battery and a Pb-acid type battery. In the example of FIG. 3, both of the Ni-mh type battery and the Pb-acid type battery have a nominal rated battery voltage of twelve volts, and are charged from a depleted state. At time $t_{START}$, both batteries begin to charge. As shown in FIG. 3, the battery voltage of the lead-acid battery quickly jumps up to the nominal rated voltage (i.e., 12 volts) and the battery accepts current at a high rate that tapers off as the charge cycle completes. Accordingly, the lead acid battery is easily recharged from a voltage source.

In contrast, the magnitude of the battery voltage of the Ni-mh battery starts the recharge cycle at a low magnitude (e.g., approximately 9-10 volts as shown in FIG. 3) and then transitions to a higher magnitude (e.g., approximately 15 volts) near the end of its charge cycle. The chemistry of the Ni-mh battery requires a nearly constant current characteristic charge profile that is capable of a variety of battery terminal voltages (i.e., approximately 9-15 volts). At the end of the charge cycle for the Ni-mh battery, the magnitude of the battery voltage $V_{BATT}$ begins to decrease (as shown by negative slope 140 in FIG. 3). This negative slope 140 is indicative of the completion of the charge cycle and may be used by the battery management circuit 132 to terminate the conduction of the charging current $I_{CHRG}$. The difference in charge behavior between the Ni-mh type batteries and the Pb-acid type batteries reflects on the complexity of the charger circuit 134, i.e., the charger circuit 134 must accommodate for both higher and lower magnitudes of the battery voltage $V_{BATT}$ across the rechargeable battery 125 during a charge cycle (while the magnitude of the DC supply voltage $V_{CC}$ on the primary electrical bus 118 remains relatively constant).

FIG. 3 also shows a timing diagram of the temperature $T_{BATT}$ of the rechargeable battery 125 during a charge cycle. The temperature $T_{BATT}$ of the rechargeable battery 125 may be relatively constant throughout the charge cycle at a nominal temperature $T_{NOM}$, which is dependent upon the ambient temperature in which the auxiliary power system 110 is operating. At the end of the charge cycle, the temperature $T_{BATT}$ of the rechargeable battery 125 increases rapidly as shown by positive slope 150. This positive slope 150 is also indicative of the completion of the charge cycle and may be used by the battery management circuit 132 to terminate the conduction of the charging current $I_{CHRG}$.

Figure 4:
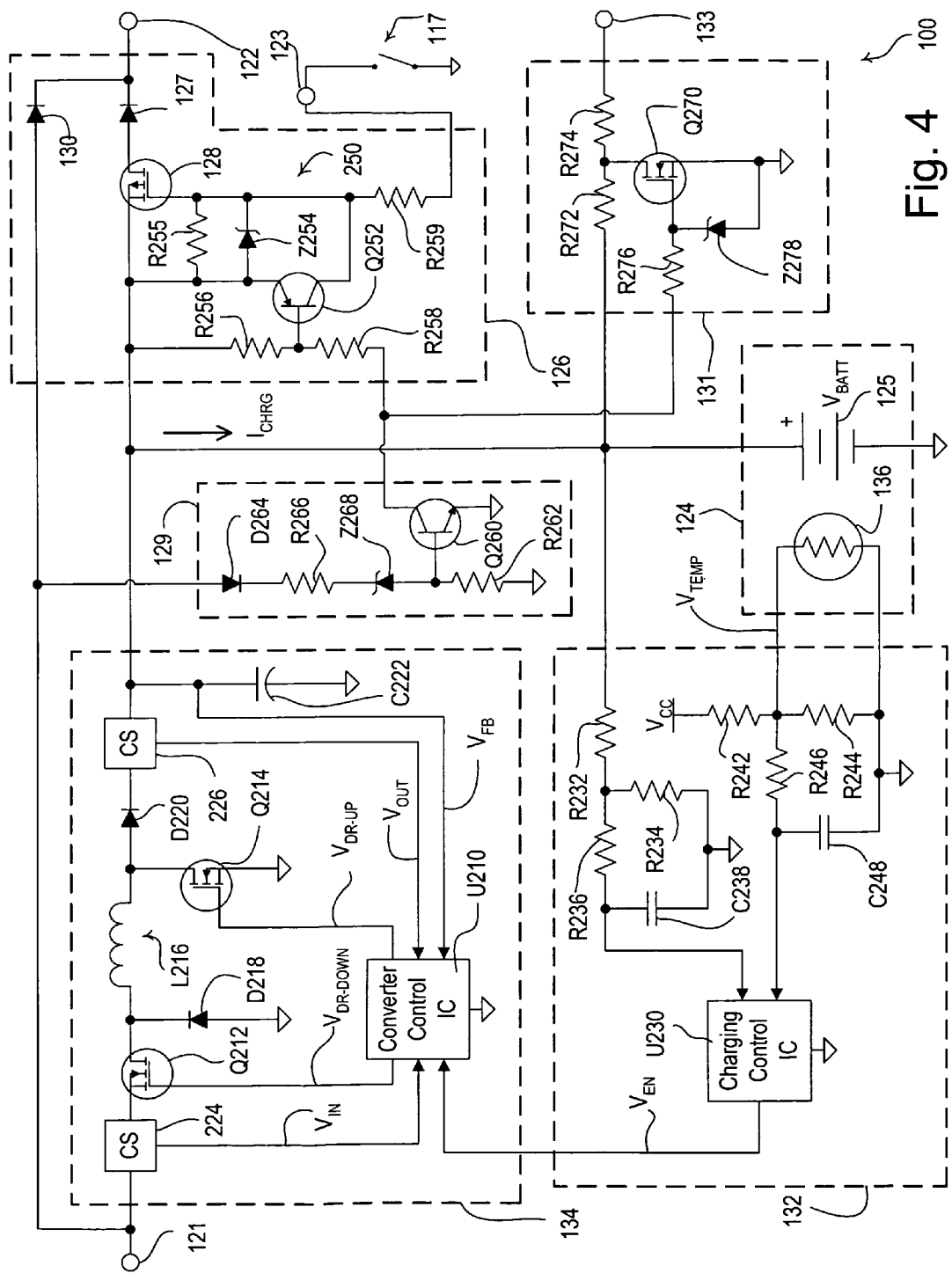
FIG. 4 is a simplified schematic diagram of the auxiliary power system of FIG. 2.

FIG. 4 is a simplified schematic diagram of the auxiliary power system 110. The charger circuit 134 comprises a step-up/step-down switching converter, which includes a converter control integrated circuit (IC) U210 (e.g., part number MAX1870A, manufactured by Maxim Technologies). The step-up/step-down converter allows the charger circuit 134 to accommodate for both the required higher and lower magnitudes of the battery voltage $V_{BATT}$ across the rechargeable battery 125 during a charge cycle and still maintain reasonable thermal efficiency. The charging enable control signal $V_{EN}$ (that is generated by the battery monitor circuit 135) is coupled to an enable pin of the converter control IC U210. When the enable control signal $V_{EN}$ is driven high (i.e., to approximately the DC supply voltage $V_{CC}$), the charger circuit 134 conducts the charging current $I_{CHRG}$ through the rechargeable battery 125 for charging the battery. When the enable control signal $V_{EN}$ is driven low (i.e., to approximately circuit common), the charger circuit 134 stops conducting the charging circuit $I_{CHRG}$ thus stopping the charge cycle.

The charger circuit 134 comprises two MOSFET switches Q212, Q214, a single inductor L216, diodes D218, D220, and an output capacitor C222 to step-up or step-down the voltage across the terminals of the battery pack 124 to match the requirement of rechargeable battery 125 as the battery is charged. Specifically, the converter control IC U210 generates a step-down drive signal $V_{DR-DOWN}$ for rendering the first MOSFT switch Q212 conductive and non-conductive, and a boost drive signal $V_{DR-UP}$ for rendering the second MOSFT switch Q214 conductive and non-conductive. When the charger circuit 134 is stepping down the voltage, the converter control IC U210 maintains the second MOSFET switch Q214 non-conductive, and controls the first MOSFET switch Q212 to be conductive and non-conductive to thus generate the battery voltage $V_{BATT}$ across the rechargeable battery 125 (i.e., as in a standard buck converter topology). When the charger circuit 134 is stepping up the voltage, the converter control IC U210 maintains the first MOSFET switch Q214 conductive, and controls the second MOSFET switch Q212 to be conductive and non-conductive to thus generate the battery voltage $V_{BATT}$ across the rechargeable battery 125 (i.e., as in a standard boost converter topology).

The charger circuit 134 further comprises input and output current sense circuits 224, 226 (e.g., each comprising a sense resistor) for generating respective input and output current sense signals $V_{IIN}$, $V_{IOUT}$ for the converter control IC U210. The converter control IC U210 measures the magnitude of the charging circuit $I_{CHRG}$ (i.e., the output current) delivered to the rechargeable battery 125 via the output current sense circuit 226 and appropriately controls the MOSFET switches Q212, Q214 in a closed loop fashion to ensure that the magnitude of the delivered charging circuit $I_{CHRG}$ is maintained constant during the charge cycle, thus achieving a constant current characteristic.

The converter control IC U210 also receives a battery voltage feedback signal $V_{FB}$ that is representative of the magnitude of the battery voltage $V_{BATT}$. The converter control IC U210 may use battery voltage feedback signal $V_{FB}$ to monitor and control the magnitude of the battery voltage $V_{BATT}$. This provides a useful charging technique if the rechargeable battery is a lithium-ion type battery. The converter control IC U210 and the operation of the step-up/step-down converter of the charger circuit 134 is described in greater detail in U.S. Pat. No. 7,298,119, issued Nov. 20, 2007, entitled STEP-UP/STEP-DOWN (BUCK/BOOST) SWITCHING REGULATOR CONTROL METHODS, the entire disclosure of which is hereby incorporated by reference. The charger circuit 134 may alternatively comprise a fly-back converter or other suitable switch mode power supply.

According to the first embodiment of the present invention, the battery monitor circuit 135 generates the charging enable control signal $V_{EN}$ in response to the magnitude of the battery voltage $V_{BATT}$ and the temperature $T_{BATT}$ of the rechargeable battery 125. The battery monitor circuit 135 comprises a charging control IC U230, which may comprise, for example, part number BQ2003, manufactured by Texas Instruments. The battery voltage $V_{BATT}$ is coupled to a battery voltage sense input pin of the charging control IC U230 via a circuit comprising resistors R232, R234, R236 (e.g., having resistances of approximately 53.6 kΩ, 5.9 kΩ, and 100 kω, respectively) and a capacitor C238 (e.g., having a capacitance of approximately 0.1 µF). For example, the charging control IC U230 may sample the battery voltage sense input pin every 34 seconds.

The charging control IC U230 is configured to begin charging the battery 125 by driving the charging enable control signal $V_{EN}$ high (i.e., to approximately the DC supply voltage $V_{CC}$) in response to the magnitude of the battery voltage $V_{BATT}$ dropping below the minimum battery voltage $V_{BATT\text{-}MIN}$ or when the charging control IC U230 (i.e., when the magnitude of the DC supply voltage $V_{CC}$ rises to a valid level). In addition, the charging control IC U230 is configured to drive the charging enable control signal $V_{EN}$ low (i.e., to approximately circuit common) to stop charging the battery 125 if the magnitude of the battery voltage $V_{BATT}$ is decreasing. Specifically, the charging control IC U230 stops charging the battery 125 if the magnitude of the battery voltage $V_{BATT}$ is lower than the previously measured magnitude by at least a predetermined value, e.g., approximately 120 mV.

As shown in FIG. 4, the integral thermal sensor 136 of the battery pack 124 comprises an NTC thermistor, which is coupled to a temperature sense input pin of the charging control IC U230 via a circuit comprising resistors R242, R244, R246 (e.g., having resistances of approximately 1.96 kΩ, 1.4 kΩ, and 100 kΩ) and a capacitor C248 (e.g., having a capacitance of approximately 0.1 µF). For example, the charging control IC U230 may sample the temperature sense input pin every 34 seconds. The charging control IC U230 is configured to stop charging the battery 125 by driving the charging enable control signal $V_{EN}$ low if the temperature $T_{BATT}$ of the battery is increasing by more than, for example, approximately one degree Celsius per minute.

As shown in FIG. 4, the controllably conductive device 128 of the output power delivery circuit 126 comprises a P-type MOSFET switch. The output power delivery circuit 126 comprises a gate drive circuit 250 coupled between the output of the voltage detect circuit 129 and the gate of the controllably conductive device 128. The gate drive circuit 250 comprises a PNP bipolar junction transistor Q252, a zener diode Z254 (e.g., having a breakover voltage of approximately 15 volts), and resistors R255, R256, R258 (e.g., having resistances of approximately 100 kΩ, 10 kΩ, and 10 kΩ, respectively). The gate of the controllably conductive device 128 is further coupled to the auxiliary power system enable terminal 123 through a resistor R259 (e.g., having a resistance of approximately 1.8 kΩ) for enabling and disabling the auxiliary power system 110. When the external switch 117 connected to the auxiliary power system enable terminal 123 is open, the controllably conductive device 128 cannot be rendered conductive (i.e., the auxiliary power system 110 is disabled). When the external switch 117 is closed and the output of the voltage detect circuit 129 is high, the transistor Q252 is rendered non-conductive, such that the gate of the controllably conductive device 128 is pulled down towards circuit common through the resistor R259 and the auxiliary power system enable terminal 123, and the controllably conductive device 128 is rendered conductive. When the output of the voltage detect circuit 129 is driven low, the resistors R256, R258 conduct current, such that the transistor Q252 is rendered conductive, and such that the controllably conductive device 128 is rendered non-conductive.

The voltage detect circuit 129 receives the input voltage $V_{IN}$ on the primary electrical bus 118 via the electrical input terminal 121 and controls the gate drive circuit 250 of the output power delivery circuit 126 to render the controllably conductive device 128 conductive and non-conductive. The voltage detect circuit 129 comprises a NPN bipolar junction transistor Q260 and a resistor R262, which is coupled across the base-emitter junction of the transistor Q260 and has a resistance of, for example, approximately 10 kΩ. The base of the transistor Q260 is coupled to the electrical input terminal 121 through the series combination of a diode D264, a resistor R266 (e.g., having a resistance of approximately 750Ω), and a zener diode Z268 (e.g., having a breakover voltage of approximately 10 volts). When the input voltage $V_{IN}$ on the primary electrical bus 118 exceeds approximately the breakover voltage of the zener diode Z268 (i.e., the predetermined bus voltage threshold $V_{BUS\text{-}TH}$ of ten volts), the transistor Q260 is rendered conductive, thus rendering the controllably conductive device 128 of the output power delivery circuit 126 non-conductive. During emergency conditions (when the input voltage $V_{IN}$ on the primary electrical bus 118 drops below the predetermined bus voltage threshold $V_{BUS\text{-}TH}$), the transistor Q260 is rendered non-conductive, such that the controllably conductive device 128 of the output power delivery circuit 126 is rendered conductive, thereby allowing power to flow from the battery 125 to the electrical output terminal 122.

The information signal circuit 131 comprises a controllably conductive device, e.g., an N-type MOSFET switch Q270, as shown in FIG. 4. The information signal circuit 131 further comprises two resistors R272, R274, which are coupled in series between the battery voltage $V_{BATT}$ and the information signal terminal 133, and may have, for example, resistances of approximately 10 kΩ and 750Ω, respectively. The gate of the MOSFET switch Q270 is coupled to the output of the voltage detect circuit 129 via a resistor R276 (e.g., having a resistance of approximately 10 kΩ). A zener diode Z278 has a breakover voltage of, for example, approximately 15 volts, and is coupled between the gate and the source of the MOSFET switch Q270 for protecting the MOSFET switch. When the input voltage $V_{IN}$ on the primary electrical bus 118 exceeds the predetermined bus voltage threshold $V_{BUS\text{-}TH}$, the output of the voltage detect circuit 129 is driven low, thus rendering the MOSFET switch Q270 non-conductive, such that the information output signal is provided on the information signal terminal 133. During emergency conditions, the output of the voltage detect circuit 129 is high, such that the MOSFET switch Q270 is rendered conductive and the junction of the resistors R272, R274 is pulled down towards circuit common. Accordingly, the information signal terminal 133 is driven low to approximately zero volts to signal that the electrical load 112 is receiving electrical power from the rechargeable battery 125.

Figure 5:
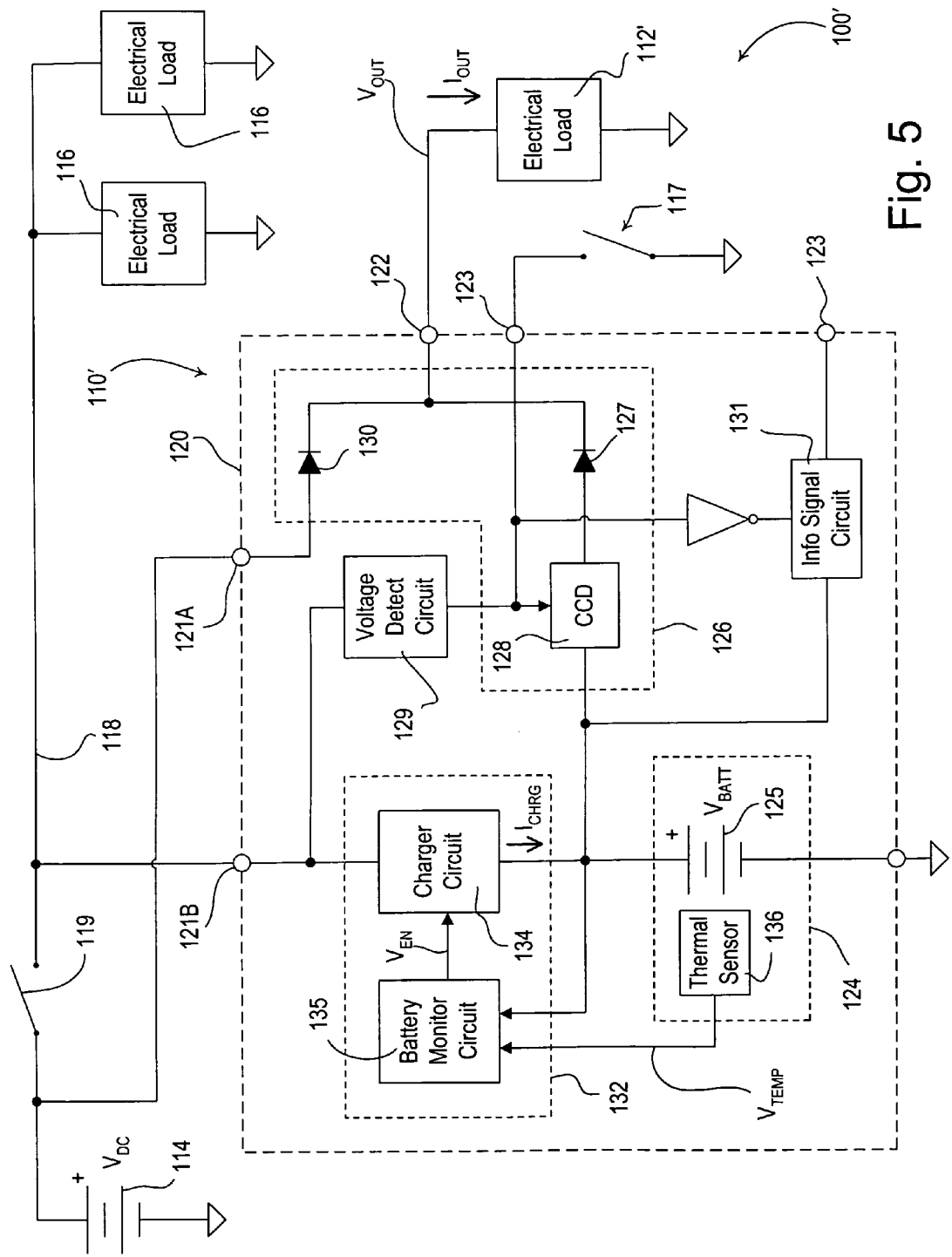
FIG. 5 is a simplified block diagram of a vehicle electrical system having an auxiliary power system for providing normal and emergency power to an electrical load according to a second embodiment of the present invention.

FIG. 5 is a simplified block diagram of a vehicle electrical system 100' having an auxiliary power system 110' for providing normal and emergency power to an electrical load 112', e.g., an electronic ignition module (EIM), according to a second embodiment of the present invention. The auxiliary power system 110' comprises first and second electrical input terminals 121A, 121B. The first electrical input terminal 121A is directly connected to the power source 114 (i.e., the main battery), while the second electrical input terminal 121B is directly connected to the primary electrical bus 118 (i.e., on the other side of the main contactor 119). The voltage detect circuit 129 and the charger circuit 134 are connected to the second electrical input terminal 121B. During normal power conditions, the electrical load 112' receives power directly from the power source 114. During emergency conditions (i.e., in the event of a failure of the power source 114 or the main contactor 119), the voltage detect circuit 129 renders the controllably conductive device 128 conductive and the electrical load 112' receives power from the rechargeable battery 125. When the main contactor 119 is opened (i.e., to turn off the vehicle electrical system 100', the charger circuit 134 is disconnected from the power source 114, such that the charger circuit does not attempt to charge the rechargeable battery 125 (and thus potentially deplete the power source 114) when the vehicle electrical system 100' is off.

Figure 6:
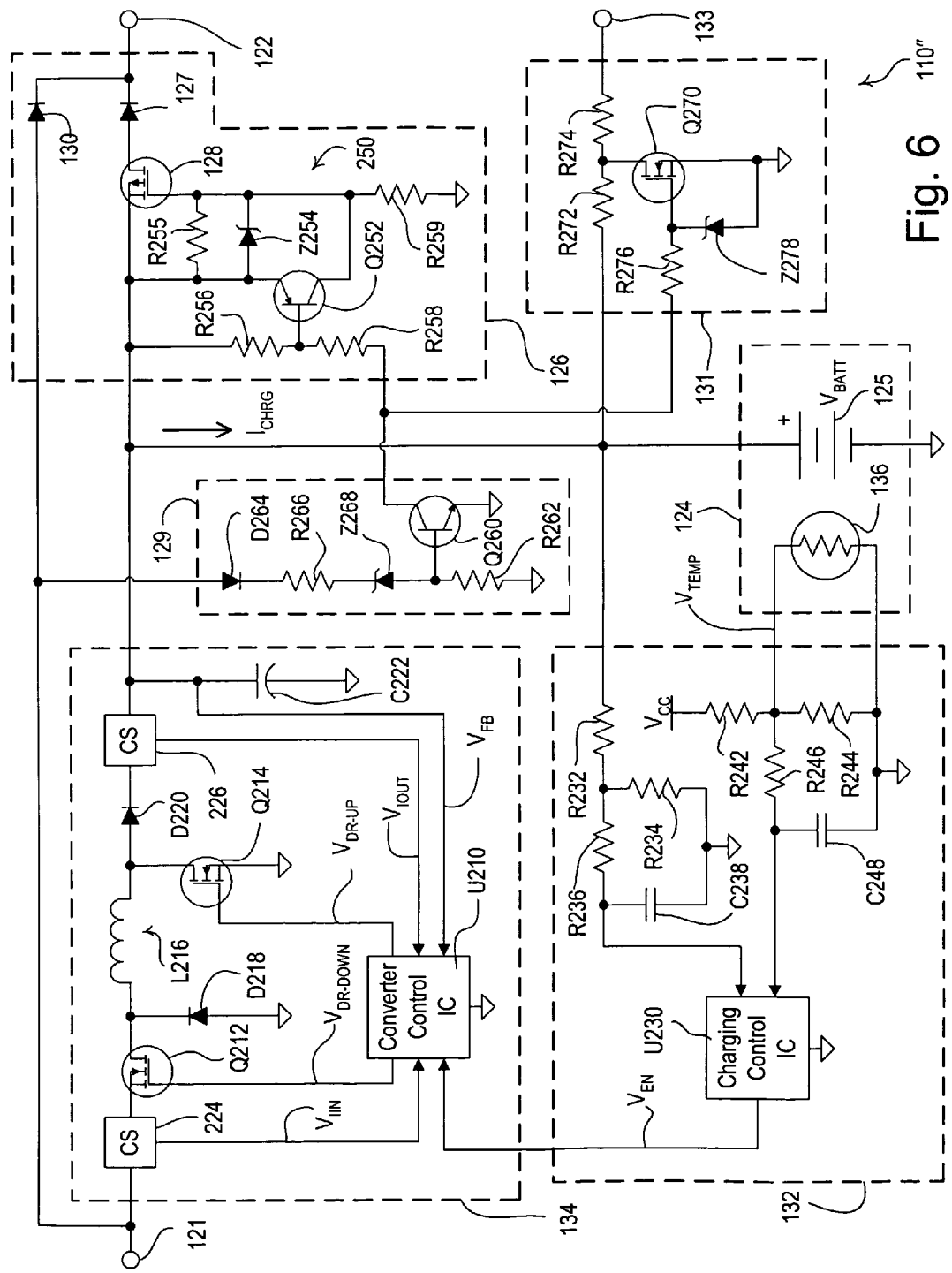
FIG. 6 is a simplified schematic diagram of an auxiliary power system according to a third embodiment of the present invention.

FIG. 6 is a simplified schematic diagram of an auxiliary power system 110'' according to a third embodiment of the present invention. The auxiliary power system 110'' of the third embodiment is very similar to the auxiliary power system 110 of the first embodiment shown in FIG. 4. However, the auxiliary power system 110'' does not comprise the auxiliary power system enable terminal 123. Instead, the gate of the controllably conductive device 128 of the output power delivery circuit 126 is permanently coupled to circuit common through the resistor R259, such that the auxiliary power system 110'' is always enabled.

Figure 7:
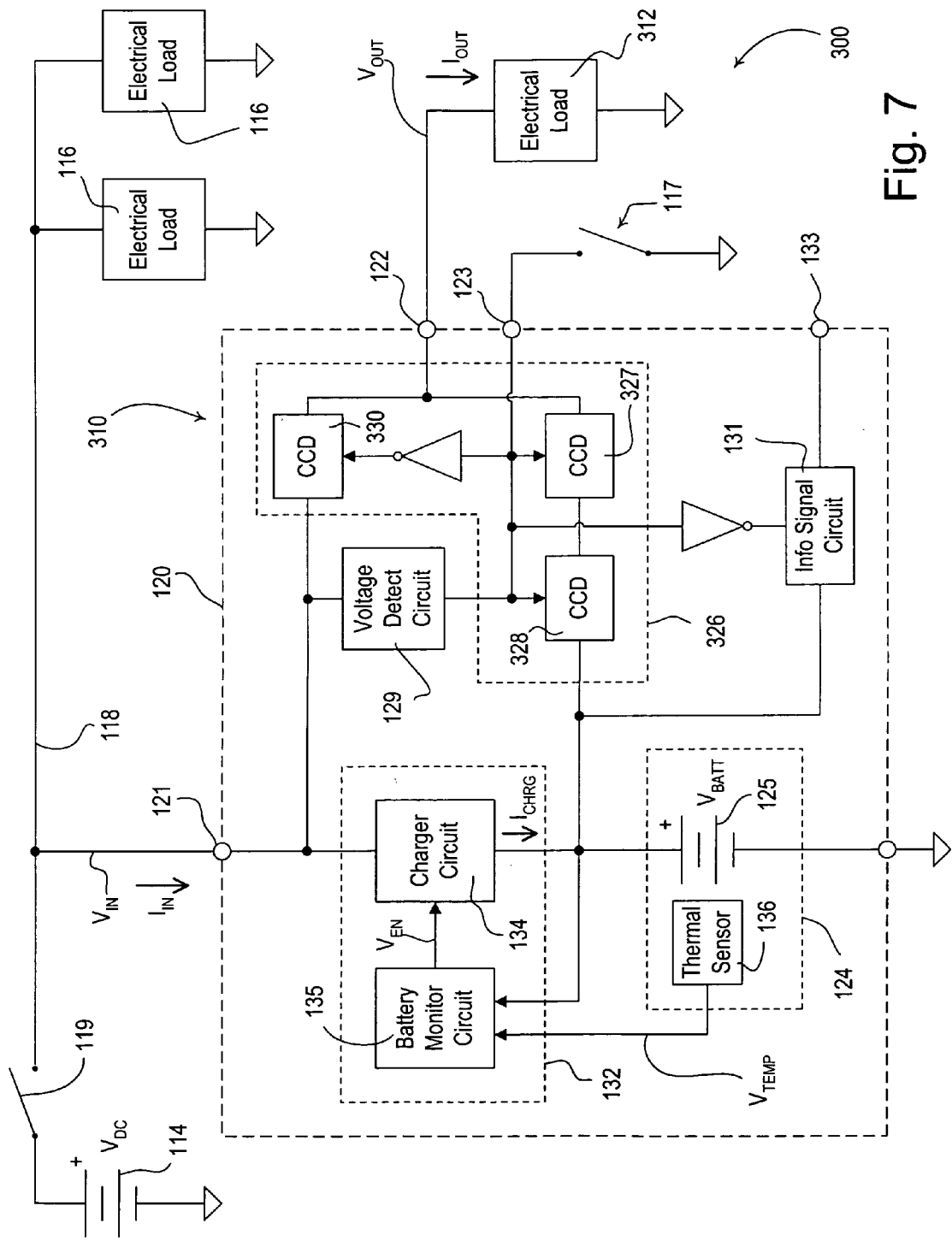
FIG. 7 is a simplified block diagram of a vehicle electrical system having an auxiliary power system for providing normal and emergency power to an electrical load according to a fourth embodiment of the present invention.

FIG. 7 is a simplified block diagram of a vehicle electrical system 300 having an auxiliary power system 310 for providing normal and emergency power to the electrical load 312 according to a fourth embodiment of the present invention. The vehicle electrical system 300 and the auxiliary power system 310 of the fourth embodiment have similar functional blocks as the vehicle electrical system 100 and the auxiliary power system 110 of the first embodiment, respectively. However, the auxiliary power system 310 of the fourth embodiment comprises an output power delivery circuit 326 having the three controllably conductive devices 327, 328, 330. The first controllably conductive device 330 is coupled to deliver power from the electrical input terminal 121 to the electrical output terminal 122, while the series combination of the second and third controllably conductive devices 327, 328 is coupled to deliver power from the rechargeable battery 125 to the electrical output terminal. The second and third controllably conductive devices 327, 328 are rendered conductive and non-conductive at the same time in response to the voltage detect circuit 129. The first controllably conductive device 330 is rendered conductive when the series combination of the second and third controllably conductive devices 327, 328 is non-conductive, and is rendered non-conductive when the series combination of the second and third controllably conductive devices is conductive.

Figure 8:
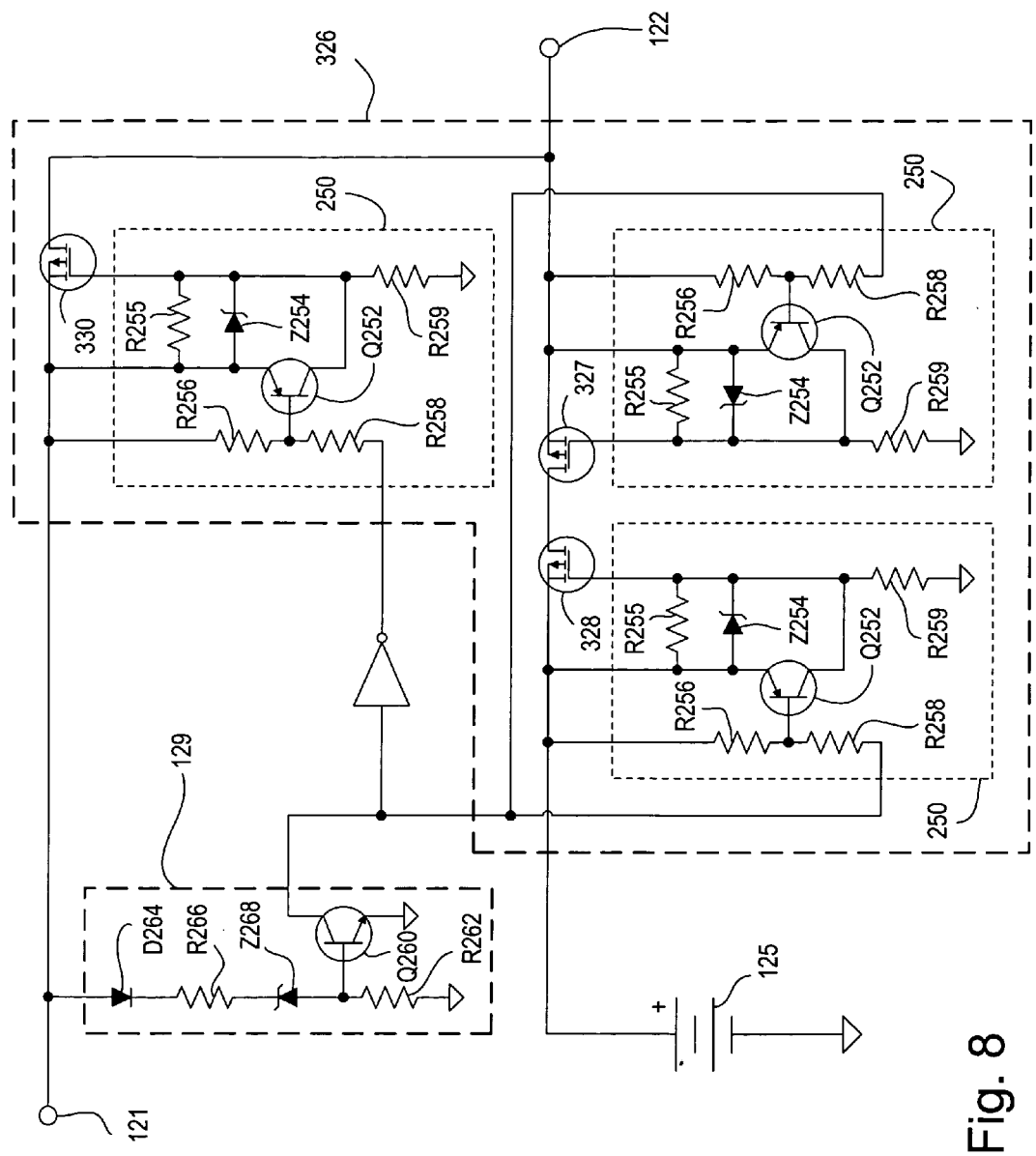
FIG. 8 is a simplified schematic diagram of an output power delivery circuit and a voltage detect circuit of the auxiliary power system of FIG. 7 according to the fourth embodiment of the present invention.

FIG. 8 is a simplified schematic diagram of the output power delivery circuit 326 and the voltage detect circuit 129 of the auxiliary power system 310 of the fourth embodiment. As shown in FIG. 8, the first, second, and third controllably conductive devices 327, 328, 330 are implemented as MOSFET switches, and the second and third controllably conductive devices 327, 328 are coupled in anti-series connection. The controllably conductive devices 327, 328, 330 are coupled to the voltage detect circuit 129 via respective gate drive circuits 250. The series combination of the second and third controllably conductive devices 327, 328 is rendered conductive during emergency conditions when the magnitude of the input voltage $V_{IN}$ on the primary electrical bus 118 drops below the predetermined bus voltage threshold $V_{BUS\text{-}TH}$. The first controllably conductive device 330 is rendered conductive during normal power conditions when the magnitude of the input voltage $V_{IN}$ on the primary electrical bus 118 exceeds the predetermined bus voltage threshold $V_{BUS\text{-}TH}$.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An auxiliary power system for an electrical load in a vehicle electrical system having a primary electrical bus and an electrical load, the auxiliary power system comprising:

an electrical input adapted to be connected to the primary electrical bus for receiving power from the primary electrical bus;

an electrical output adapted to be coupled in electrical communication with the electrical load of the vehicle electrical system;

an auxiliary battery having first and second terminals for producing a battery voltage that provides auxiliary power to the electrical load through the electrical output;

a thermal transducer in physical contact with the auxiliary battery, the thermal transducer generating an electrical signal representative of the temperature of the auxiliary battery;

a charger circuit electrically connected to the first and second terminals of the auxiliary battery and responsive to the thermal transducer, the charger circuit adapted to receive power from the primary electrical bus through the electrical input, the charger circuit adapted to deliver a controlled charging current to the auxiliary battery via the first and second terminals, and wherein the charger circuit is responsive to at least the temperature of the auxiliary battery to control the charging current delivered to the auxiliary battery; and an output power delivery circuit comprising first and second unidirectional electrically conductive devices and a controllably conductive device, the first unidirectional electrically conductive device electrically coupled between the electrical input and the electrical output so as to provide power to the electrical load from the electrical input during a normal power condition, the second unidirectional electrically conductive device electrically coupled in series with the controllably conductive device;

wherein the series combination of the second unidirectional electrically conductive device and the controllably conductive device is electrically coupled between the electrical output and at least one of the first and second terminals of the auxiliary battery to provide a path for power delivery from the auxiliary battery to the electrical load during an emergency power condition.

2. The system of claim 1, wherein the output power delivery circuit further comprises a voltage detect circuit in electrical communication with the controllably conductive device and further in electrical communication with the electrical input, the voltage detect circuit responsive to the magnitude of the voltage on the electrical input and operable to render the controllably conductive device conductive and non-conductive in response to the magnitude of voltage present on the electrical input, and wherein the controllably conductive device is rendered conductive when the magnitude of the voltage on the electrical input is below a first predetermined threshold.

3. The apparatus of claim 2, wherein the auxiliary battery delivers power to the electrical load via the series combination of the second unidirectional electrically conductive device and the controllably conductive device when the magnitude of the voltage at the electrical input falls below the first predetermined level.

4. The apparatus of claim 2, further comprising:
an information signal connector for providing an information output signal, the information output signal derived from the voltage detect circuit and from the magnitude of the battery voltage of the auxiliary battery, and wherein the information output signal provides an indication of the magnitude of the battery voltage of the auxiliary battery when the magnitude of the voltage on the electrical input is above the first predetermined level.

5. The apparatus of claim 2, further comprising:
an enclosure housing the auxiliary battery, the charger circuit, the voltage detect circuit and the first and second unidirectional electrically conductive devices;
wherein the charger circuit is in direct thermal communication with the enclosure to dissipate heat generated by the charger circuit.

6. The apparatus of claim 1, wherein the charger circuit is responsive to at least one of the magnitude or the rate change of magnitude of the terminal voltage between the first and second terminals of the auxiliary battery, and wherein the charger circuit stops conducting the charging current through the auxiliary battery when either the magnitude of the battery voltage exceeds a second predetermined threshold or the rate change of the terminal voltage exceeds a predetermined maximum negative rate.

7. The apparatus of claim 1, wherein the auxiliary battery has a nickel-metal-hydride chemistry.

8. An apparatus for providing emergency and normal power to an electrical load in a vehicle electrical system comprising:
first and second electrical inputs to the apparatus, the first and the second electrical inputs adapted to be electrically connected to a source of DC power available in the vehicle electrical system;
an electrical output of the apparatus connectable to the electrical load;
a rechargeable battery having first and second main terminals, the rechargeable battery operable to receive and deliver electrical power;
a battery charging circuit adapted to receive electrical power from the first electrical input and in electrical communication with the first and second main terminals of the rechargeable battery;
a power delivery circuit electrically coupled between the second electrical input and the electrical output, the power delivery circuit further electrically coupled to the rechargeable battery for additionally receiving power from the rechargeable battery, the power delivery circuit adapted to direct the flow of power available to the electrical output of the apparatus from either the second electrical input or the rechargeable battery; and
a thermally-conductive enclosure housing the rechargeable battery, the battery charging circuit, the first and second electrical inputs, the electrical output and the power delivery circuit;
wherein the power delivery circuit and the battery charging circuit are in thermal communication with the thermally-conductive enclosure.

9. The apparatus of claim 8, further comprising:
a voltage detect circuit electrically coupled with one of the first or second electrical inputs of the apparatus and in electrical communication with the power delivery circuit;
wherein the voltage detect circuit determines whether the power available on the electrical output of the apparatus comes from the rechargeable battery or from one of the first or second electrical inputs of the apparatus.

10. The apparatus of claim 9, wherein the voltage detect circuit causes the power delivery circuit to direct the flow of the power available at the electrical output from the second power input to the rechargeable battery when the magnitude of the voltage on the first or second electrical input falls below a predetermined threshold voltage.

11. The apparatus of claim 8, wherein the thermally-conductive enclosure forms a heat sink to dissipate thermal losses generated in the battery charging circuit and the power delivery circuit.

12. The apparatus of claim 8, wherein the first electrical input and the second electrical input to the apparatus are connected to two separate sources of DC power in the vehicle electrical system.

13. The apparatus of claim 8, wherein the battery charging circuit is responsive to the temperature of the rechargeable battery and is responsive to the magnitude of the rate change of battery voltage, and wherein the battery charging circuit discontinues the charging of the rechargeable battery when either of the rate of change of the battery temperature exceed a first predetermined rate or the rate of change of the battery voltage exceed a second predetermined negative rate.

14. A back-up battery power delivery system comprising:
an enclosure;
a rechargeable battery within the enclosure;
a battery management circuit within the enclosure, wherein the battery management, circuit maintains the charge state of the rechargeable battery;
a power delivery circuit within the enclosure;
an electrical input adapted to receive power to charge the rechargeable battery and to deliver electrical power to the power delivery circuit; and
an electrical output adapted to provide electrical power to a load connected to the back-up battery power delivery system;
wherein the power delivery circuit is adapted to receive power from both the electrical input and from the rechargeable battery and selectively delivers power to the electrical output based on the magnitude of the voltage available on the electrical input.

15. The system of claim 14, wherein the power delivered to the electrical output is comprised of a combination of currents delivered from the rechargeable battery and from the electrical input, and wherein a portion of the power being delivered from the electrical input is processed through the battery management circuit over a range of input voltages.

16. The system of claim 14, further comprising:
an information signal connector for providing an information output signal indicating the state of the power delivery circuit and the state of the charge of the rechargeable battery.

17. The system of claim 14, wherein the battery management circuit is responsive to at least a battery voltage and a battery temperature of the rechargeable battery.

18. The system of claim 14 wherein the enclosure is thermally-conductive and the battery management circuit, the power delivery circuit, and the rechargeable battery are in direct thermal communication with the enclosure.

19. The system of claim 14, wherein the rechargeable battery has a capacity rate of C, the battery management circuit operable to charge the battery by providing a regulated current in the range of 0.25 to 2 times the capacity rate C of the rechargeable battery.

20. The system of claim 14, wherein the power delivery circuit further comprises a first unidirectional conductive device for delivering power from the electrical input to the electrical output, a second unidirectional conductive device for delivering power from the rechargeable battery to the electrical output, and a controllably conductive device coupled in series electrical connection with the second unidirectional conductive device for controlling the delivery of power from the rechargeable battery to the electrical output, and wherein the controllably conductive device is rendered non-conductive when the rechargeable battery is being charged by the battery management circuit.

21. The system of claim 14, wherein the power delivery circuit further comprises a first controllably conductive device for delivering power from the electrical input to the electrical output, and second and third controllably conductive devices coupled in anti-series connection for delivering power from the rechargeable battery to the electrical output.

* * * * *